(12) United States Patent
Smith et al.

(10) Patent No.: US 12,231,482 B2
(45) Date of Patent: Feb. 18, 2025

(54) ALTERNATIVE SCREENSHARE PROVISION

(71) Applicant: Lenovo (Singapore) Pte. Ltd., Singapore (SG)

(72) Inventors: Joshua Smith, Milton, FL (US); Travis Ennis, Jasper, IN (US); Richard Downey, Charlestown, IN (US); Matthew Fardig, Boonville, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/889,656

(22) Filed: Aug. 17, 2022

(65) Prior Publication Data

US 2024/0064188 A1 Feb. 22, 2024

(51) Int. Cl.
*H04L 65/80* (2022.01)

(52) U.S. Cl.
CPC .................... *H04L 65/80* (2013.01)

(58) Field of Classification Search
CPC . H04L 65/80; H04L 65/1089; H04L 65/4015; H04L 65/403; H04L 65/401
See application file for complete search history.

(56) References Cited

U.S. PATENT DOCUMENTS

| | | | |
|---|---|---|---|
| 11,349,893 B1* | 5/2022 | Viswanathan Iyer | H04L 65/756 |
| 11,553,028 B1* | 1/2023 | Evans | H04L 43/0811 |
| 2022/0253268 A1* | 8/2022 | Deole | G09G 5/12 |
| 2022/0303500 A1* | 9/2022 | Watanabe | G10L 15/26 |
| 2023/0060861 A1* | 3/2023 | Agrawal | H04L 65/80 |
| 2023/0068117 A1* | 3/2023 | Johnston | H04L 65/401 |
| 2023/0199052 A1* | 6/2023 | Springer | H04L 65/1089 348/14.03 |
| 2023/0421514 A1* | 12/2023 | An | H04L 51/04 |

* cited by examiner

*Primary Examiner* — Tonia L Dollinger
*Assistant Examiner* — Mehulkumar J Shah
(74) *Attorney, Agent, or Firm* — FERENCE & ASSOCIATES LLC (57) ABSTRACT

One embodiment provides a method, the method including: detecting, during a meeting comprising at least one participant remote to a user identified as a presenter and utilizing a screenshare alternative system, visual data shared from an information handling device of the presenter to an information handling device of the at least one participant; identifying, utilizing the screenshare alternative system, an issue displaying the visual data on the information handling device of the at least one participant; and providing, utilizing the screenshare alternative system, an alternative provision of the visual data to the at least one participant. Other aspects are claimed and described.

16 Claims, 3 Drawing Sheets

ALTERNATIVE SCREENSHARE PROVISION

BACKGROUND

Video-conferencing promotes a meeting of a plurality of people from a variety of locations. Utilizing a video conferencing system and method permits the sharing of audio data and visual data to each participant present in a meeting. The sharing of audio data includes a system's ability to share audible data received from a participant attending the meeting and/or provides audio data contained within a file shared across the video-conferencing system (e.g., a media file). The sharing of visual data includes a system's ability to share image data of each participant captured in real time to the other participants. Additionally, the sharing of visual data includes the sharing of additional information to each participant on a video-conferencing call, for example, visual aids containing examples associated with a topic, additional details of a topic being discussed, and the like, can be provided from a user presenting the information to the additional participants. Such visual data promotes a further understanding of a topic presented to the participants of the meeting.

BRIEF SUMMARY

In summary, one aspect provides a method, the method including: detecting, during a meeting comprising at least one participant remote to a user identified as a presenter and utilizing a screenshare alternative system, visual data shared from an information handling device of the presenter to an information handling device of the at least one participant; identifying, utilizing the screenshare alternative system, an issue displaying the visual data on the information handling device of the at least one participant; and providing, utilizing the screenshare alternative system, an alternative provision of the visual data to the at least one participant.

Another aspect provides a system, the system including: an information handling device including at least one sensor; a processor operatively coupled to the information handling device; a memory device that stores instructions that, when executed by the processor, causes the system to: detect, during a meeting comprising at least one participant remote to a user identified as a presenter and utilizing a screenshare alternative system, visual data shared from an information handling device of the presenter to an information handling device of the at least one participant; identify, utilizing the screenshare alternative system, an issue displaying the visual data on the information handling device of the at least one participant; and provide, utilizing the screenshare alternative system, an alternative provision of the visual data to the at least one participant, A further aspect provides a product, the product including: a computer-readable storage device that stores executable code that, when executed by a processor, causes the product to: detect, during a meeting comprising at least one participant remote to a user identified as a presenter and utilizing a screenshare alternative system, visual data shared from an information handling device of the presenter to an information handling device of the at least one participant; identify, utilizing the screenshare alternative system, an issue displaying the visual data on the information handling device of the at least one participant; and provide, utilizing the screenshare alternative system, an alternative provision of the visual data to the at least one participant.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When sharing visual data over a video-conferencing meeting, a common method to use when providing visual data is a screenshare method. Screensharing includes providing the information shown on a presenter's screen to the participants attending the meeting. The presenter may elect what visual data should be shown to those participants in attendance, whether that encompasses the presenters entire display or sharing a portion of their display. In order to display the visual data being supplied from the presenter to the participants of the meeting, an information handling device of each participant must have a system component for displaying the visual data (e.g., a monitor, a display, etc.). However, since it is not a requirement for a participant joining a meeting to utilize an information handing device that includes a display or have the ability to display a certain about of visual data, an issue arises when a presenter attempts to provide visual data to the user that may not be able to view the visual data.

Conventionally, after determining that a participant lacks the ability to view visual data at their device, the participant may indicate to the presenter that the participant is unable to view the visual data. In response to such a notification, the presenter may attempt to verbally describe what is present in the visual data being provided to the other participants present in the meeting. As can be assumed, this describing of the visual data may be choppy and unclear to someone hearing a verbal description of imagery and/or additional description of a topic. Additionally, this significantly slows the presentation of the information.

Alternatively, in an attempt to provide the participant with the visual data shared by the presenter, subsequent to the completion of the meeting, the visual data may be shared in a packet form to the participant that was unable to view to the visual data. This data packet may include the visual data alone or may include the visual data along with a recording of the meeting. Regardless of what is present in the data packet, reviewing the information present within the packet will require additional time to consume the data and may further lack a level of understanding that would have been present in viewing the visual data during the description in the meeting in real time. What is needed is a system and method that may proactively determine a participant's information handling device situation (e.g., information handling device type, network connection status, a current state of the user, etc.), and provide the visual data using an alternative method upon determining that the visual data may not be viewable under the current situation.

Accordingly, the described system and method provides a technique for providing an alternative provision of visual data to at least one participant on a meeting by use of a screenshare alternative system. During a meeting consisting of at least one participant remote to a user identified as a presenter and utilizing the screenshare alternative system, the system may detect visual data shared from an information handling device of the presenter to an information handling device of the participant. After detecting the visual data to be displayed, the screenshare alternative system may identify an issue with displaying the visual data on the information handling device of the at least one participant, and then, when an issue is identified, the screenshare alternative system may provide an alternative provision of the visual data to the at least one participant. Such a method provides a participant with visual data when a traditional method fails, ensuring that each of the participants present in a meeting receive quality visual data supporting a presentation.

The illustrated example embodiments will be best understood by reference to the figures. The following description is intended only by way of example, and simply illustrates certain example embodiments.

Figure 1:
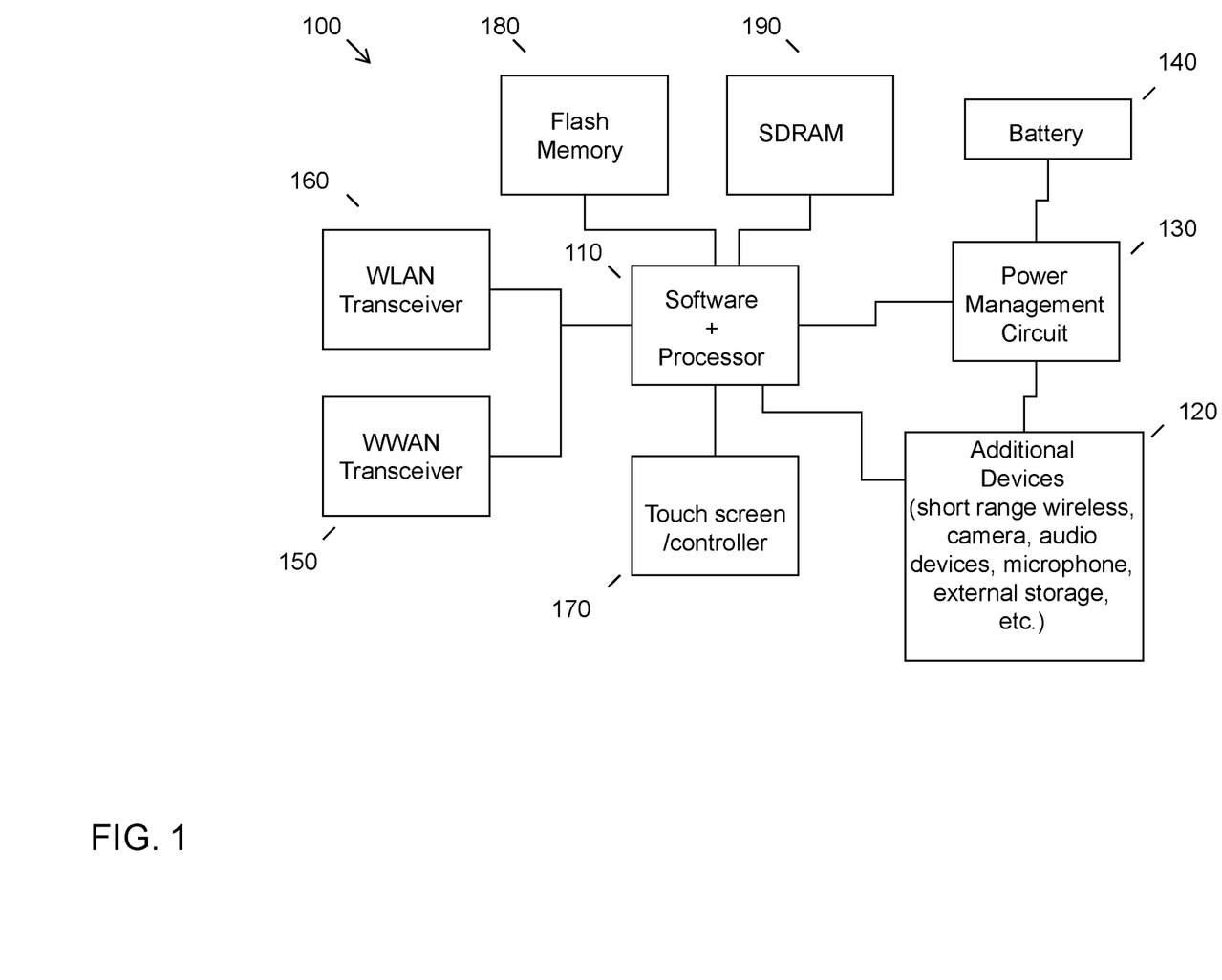
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
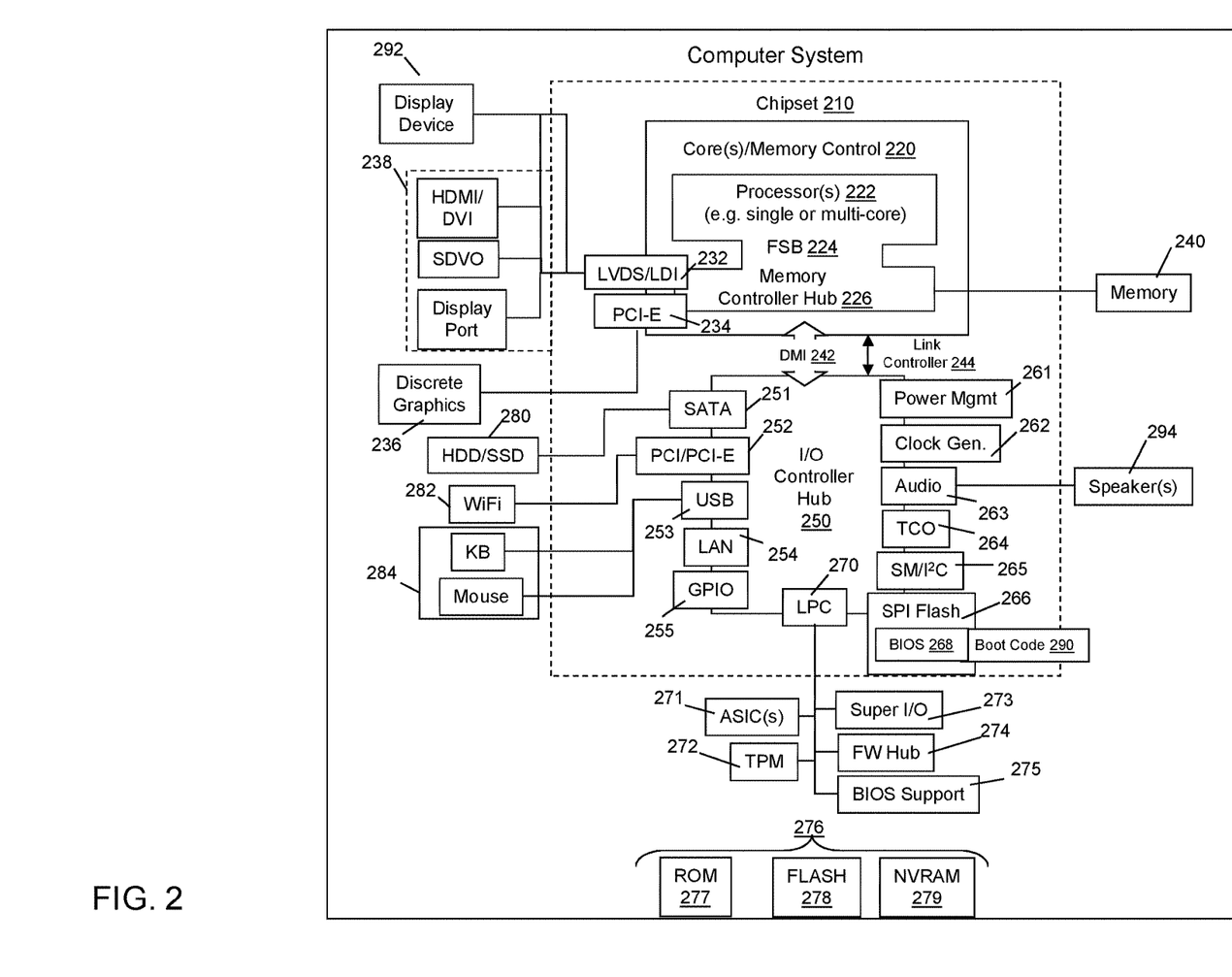
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252

(for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in a system that detects visual shared data in a meeting and/or identifies issues with displaying the visual data. For example, the circuitry outlined in FIG. 1 may be implemented in a tablet or smart phone embodiment, whereas the circuitry outlined in FIG. 2 may be implemented in a personal computer embodiment.

Figure 3:
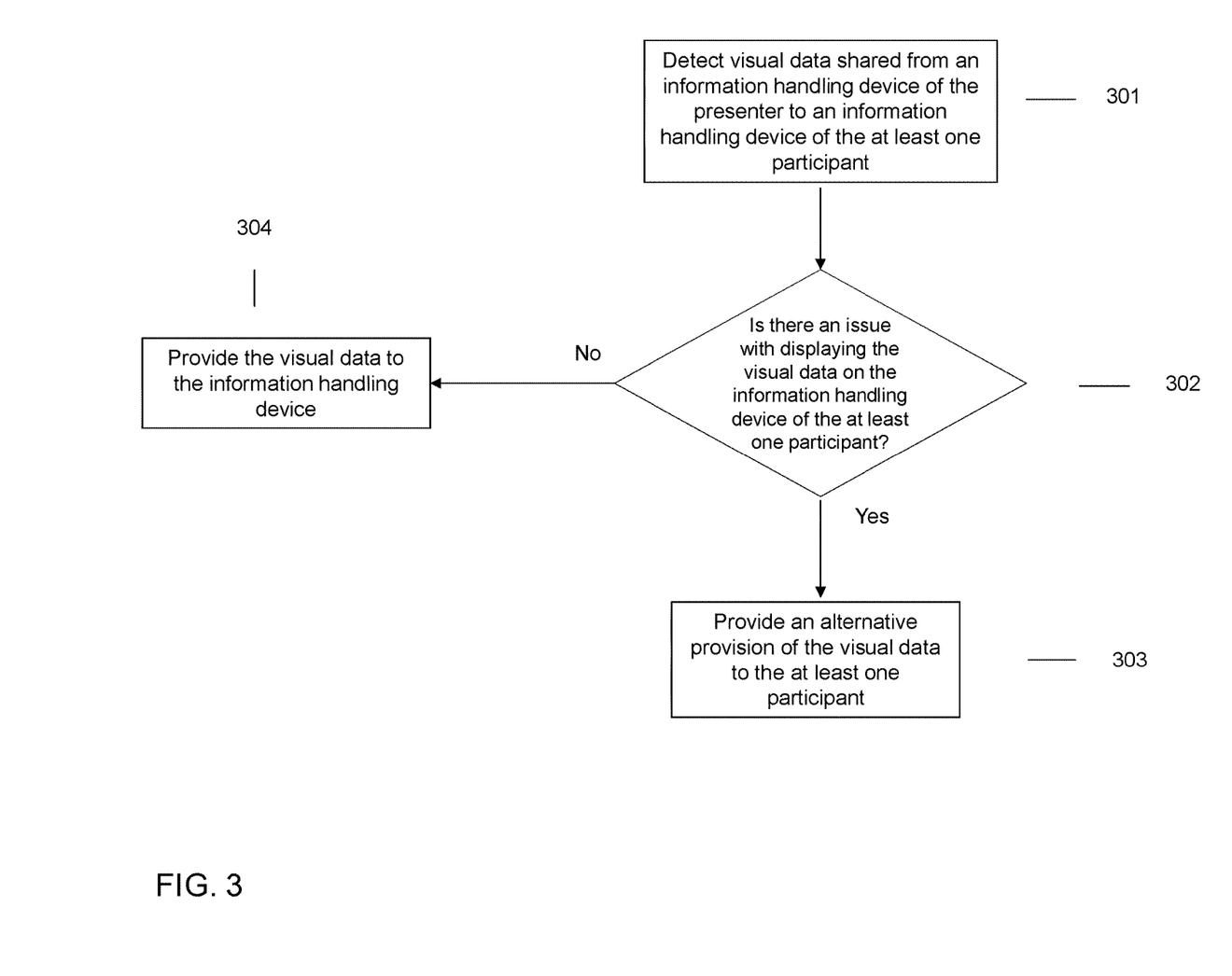
FIG. 3 illustrates an example method for identifying an issue with displaying visual data and providing an alternative provision of the visual data by use of a screenshare alternative system.

FIG. 3 illustrates an example method for identifying an issue with displaying visual data and providing an alternative provision of the visual data by use of a screenshare alternative system. The method may be implemented on a system which includes a processor, memory device, output devices (e.g., display device, printer, etc.), input devices (e.g., keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the screenshare alternative system itself is specifically programmed to perform the functions as described herein to provide visual data to a user by use of an alternate provision technique.

The screenshare alternative system may run in the background of an information handling device and may be activated when the device is activated. Additionally, or alternatively, the system may be activated when an application associated with a communication-medium (e.g., phone call application, video-conferencing application, etc.) is activated, detected, or otherwise opened. The system may also activate the system upon the detection of screensharing. In this case, the screenshare alternative system may not be activated until the system detects that a presenter has started screensharing or the system detects that the participant is receiving a screenshare. The screenshare alternative system may also be activated only if the system detects that a participant cannot receive screenshare data, whether that is a lack of access to a display, a poor network connection and lack of ability to clearly view visual data, and/or a current state of a user attending a meeting.

Once the screenshare alternative system is activated on a device, the system may be utilized throughout the process of identifying a potential issue with displaying visual data on an information handling device of a participant of a meeting. Continued use of the screenshare alternative system in identifying potential issues when displaying the visual data will train the device in detecting visual data to be shared from a presenter device over a communication medium, identifying when there is an issue with displaying the visual data to the device of the participant, and thereafter providing an alternative provision of the visual data to the participant.

To perform the steps present in the screenshare alternative system and in order to accurately depict what is discussed between the participants on the recorded communication, the screenshare alternative system may utilize a neural network, machine-learning model, and/or other learning algorithm, collectively referred to as a machine-learning model for ease of readability. The machine-learning model can be trained utilizing recorded communications previously parsed and detecting visual data to be shared and displayed. In other words, the machine-learning model is given annotated recorded communications where visual data is provided and associated with a device facing an issue with displaying the visual data, and are already labeled or annotated. These annotated communications are referred to as a training dataset.

Using the training dataset, which may change over time, the machine-learning model learns nuances between participants and devices in use when communicating within a recorded communication. This results in more accurately identifying a participant and a device being used to access a communication medium. For example, the machine-learning model can learn different devices with variable displays for potentially displaying visual data if the original participant device cannot display visual data. As information is determined within newly obtained communications and is confirmed or modified, the machine-learning model can learn additional nuances and become more accurate and refined over time. Thus, while there is an initial training dataset that is used to initially train the machine-learning model, the machine-learning model is learning over time based upon new information received by the machine-learning model, thereby evolving to become more accurate.

At 301, during a meeting consisting of at least one participant remote to a user identified as a presenter and utilizing a screenshare alternative system, the system may detect visual data shared from an information handling device of the presenter to an information handling device of the at least one participant. In the system, the at least one participant and the presenter may access a communication medium through information handling devices in order to join a virtual meeting or meeting conducted using conferencing, video conferencing, or other remote meeting applications. The remote meeting application allow participants of the meeting to join the meeting from different physical and/or geographical location.

Simply by downloading an application and/or plug-in, or utilizing traditional methods, such as dialing into the meeting, a communication medium provides a central location that a plurality of participants may meet, and further permits the accessing of the communication over a plurality of different types of devices. For example, when accessing a communication medium, a participant may elect to join by use of a laptop computer, while another may elect to join the meeting by use of a landline phone. Both pieces of technology, and all that range between them, may be used to access the meeting. There is no limitation on which devices may access the meeting as long as the device permits communicating through the device, or through a sensor operatively coupled to the device, over a communication medium. Thus, participants can join a meeting with a device that does not include a display device.

The communication medium hosting the meeting may accept and present the visual data provided from the presenter to the at least one participant. For ease of understanding, the participant sharing the visual data will be referred to as the presenter. It should be noted that the presenter can change during the course of a meeting. A communication medium commonly includes a visual presentation and/or a screenshare portion permitting the sharing of visual data through the communication medium. Additionally, or alternatively, the system may provide visual data directly to each participant of a meeting rather than sharing the information through a communication medium. Such a technique may be utilized when sharing large amounts of visual data and/or sharing visual data requiring the use of a specific program not supported by the communication medium. Throughout this disclosure, continued reference to the sharing of visual data through a communication medium is reference; however, this is intended to be a non-limiting example.

Detecting shared visual data, at 301, may include detecting that one of the participants has indicated that visual data should be shared. Upon detecting the shared visual data, the screenshare alternative system may determine characteristics associated with the visual data. For example, the screenshare alternative system may detect a size of a file containing the visual data, a required network strength to accurately depict the visual data on the information handling device (e.g., enough bandwidth in current area to produce clear images), a frequency of updating the visual data, and the like. In other words, the screenshare alternative system attempts to identify characteristics of the visual data that provide an indication of the requirements of an information handling device so that the information handling device can display the visual data.

After detecting visual data shared from an information handling device of the presenter, the screenshare alternative system may identify if there is an issue with displaying the visual data on the information handling device of the at least one participant at 302. To identify if there is an issue with displaying the visual data, an information handling device of each participant may be detected and characteristics of the information handling device and/or the user may be determined. For example, the system may detect a device type (e.g., smart phone, laptop computer, cellular phone, television, tablet, etc.) which may provide an indication of whether a display is available, Internet connection characteristics (e.g., bandwidth availability, upload/download speeds, signal strength, etc.), a state of the user (e.g., geographical location, movement, an environment of the user, etc.), and/or the like.

As an example, the screenshare alternative system may detect an information handling device type to determine if the device comprises a display and/or a display able to be used to view the visual data. Such a determination is performed to ascertain that a quality of the visual data does not suffer. Thus, if the system determines the display of an information handling device is unable to accurately display the visual data, the system may identify, at 302, that an issue with displaying the visual data is present. Further, the system may determine that the information handling device of the participant does not have a display. Such a determination clearly exemplifies an issue with displaying the visual data at the device of the participant, at 302, because there is not a display embedded on the device of the participant.

In the system, when identifying if there is an issue with displaying the visual data on the information handling device of the at least one participant, at 302, the screenshare alternative system may determine that the information handling device of the at least one participant has a network connection having a quality less than a predetermined threshold. In other words, the screenshare alternative system may determine that the network connectivity of the participant's device is not strong enough to display visual data at an acceptable quality level. The system may also identify that the network connectivity is not stable enough to display the visual data at an acceptable quality level. Network connectivity issues can arise when a user is moving through different areas, is in an area with a poor network connection, and/or the like. Since the participant device is identified as having a weak network connection and/or a network connection below a required threshold, a quality level of viewing the visual data is present, and such an issue is identified at 302.

Identifying an issue with displaying the visual data on the information handling device of the at least one participant may include identifying a state of the at least one participant while attending the virtual meeting. Identifying the state of the participant may include utilizing at least one sensor integrally coupled and/or operatively coupled to the device of the participant to determine the state of the participant. The state of the user may include a geographical area or location of the user, a movement of the user, an environment of the user, and/or the like. For example, if the information handling device collects data related to a current speed a participant is traveling with and/or location data of the user, the screenshare alternative system may determine that the user is driving. As one can imagine, viewing visual data is not ideal nor safe to do while driving. In the system, the state of the of participant is determined to reduce the ability of the at least one participant to view the visual data. Thus, when the determined state of the user impedes viewing visual data, an issue with displaying the visual data on the information handing device of the at least one participant, at 302, is present.

When the screenshare alternative system determines that there is not an issue with displaying the visual data on the information handling device of the at least one participant, at 302, the system may provide the visual data to the information handling device of the participant, at 304, without issue. The device in which the participant is utilizing to access the meeting contains an acceptable display, exceeds the threshold value of network connectivity, and a state of the participant does not reduce the participant's ability to view the visual data, the screenshare system may provide the visual data to the participant's information handling device at 304.

However, when the screenshare system does identify an issue, at 302, an alternative provision for providing the visual data to the at least one participant facing an issue is utilized, at 303. In the system, subsequent to identifying the issue with displaying the visual data, at 302, the screenshare alternative system may select the alternative provision for providing the visual data to the at least one participant, at 303, based upon the identified issue. In other words, the selected alternate provision may be directly related to the issue. For example, if the issue is identified as a lack of display, the selected alternate provision technique may be a technique that does not need a display. As another example, if the issue is identified as a poor network quality, the selected alternate provision technique may be a technique that can account for a poor network quality.

One alternate provision technique is provision of the screenshare data to a device of the at least one participant other than the information handling device in use. In the system, the screenshare alternative system may have access to a profile and/or a list of devices and preferences associated with each participant accessing a meeting. Upon identifying the issue, at 302, and needing to provide an alternative provision of the visual data, at 303, the screen share system may elect an additional device to provide the visual data to in order for the participant to view the data at a quality level. In the system, the screenshare alternative system may elect to share the visual data to a device associated with the user and determined by the screenshare alternative device to be able to maintain the quality of the visual data. Additionally, or alternatively, in the system, the screenshare alternative system may provide the visual data to a device predetermined and preferred by the at least one participant. For example, if the at least one participant is associated with a plurality of devices, and has predetermined a preferred device for viewing visual data, the screenshare alternative system will provide the visual data to that device. This technique may be utilized if the user currently has access to the secondary device.

Another alternative provision technique includes the screenshare alternative system providing portions of the visual data at intervals to the information handling device of the participant. Upon determining a size of the visual data to be displayed, the screenshare alternative system may elect to decrease a size of the amount of visual data to be supplied to the device of the participant. Decreasing the amount of visual data may maintain a quality level when being displayed in small parts. In other words, rather than displaying all the visual data received at a single interval where the amount of bandwidth would be at a maximum level, the screenshare system elects to provide the visual data in multiple intervals where each of the multiple intervals requires less bandwidth to display. Thus, when a network connection is present but is not strong enough to overcome a predetermined threshold required to display all the visual data at a desired quality level, portioning the visual data to be supplied at intervals requiring a smaller amount of bandwidth to maintain a quality level of the visual data acts as an alternative provision for providing the visual data to the participant.

The alternative provision for providing portions of the visual data at intervals may coincide with providing portions of the visual data based upon triggers from the presenter. In the system, the screenshare alternative system may utilize a machine-learning process, as mentioned previously, to determine when a presenter is speaking on a topic present within the visual data. The screenshare alternative system may utilize, for example, natural language processing (NLP) techniques, to interpret what a presenter in communicating while in the meeting. Further, the use of image and/or content analysis techniques may be applied to visual data upon receipt at the screenshare alternative system, interpreting the information present in the visual data. Subsequent to interpreting the information present in the visual data, the screenshare may determine triggers within the presentation that fall in line with when the screenshare alternative system should supply a portion of the visual data to the participant. For example, the screenshare alternative system may determine that during the presentation the presenter will be discussing types of fruit, and upon the mentioning, or trigger, of an apple, the screenshare alternative system will provide the visual data associated with an apple. As the presentation carries on, upon the mentioning, or triggering, of an orange, the screenshare alternative system may provide visual data associated with an orange. Additionally, or alternatively, the triggers may be based on an action performed by the presenter (e.g., changing a slide, a user providing a particular gesture or word/phrase, etc.). Other triggers may include predetermined time intervals, as visual content is changed, when different applications are accessed, and/or the like.

Another alternative technique is to provide a text-based or different modality-based version of the visual data to the user. The system may utilize machine-learning techniques, as described previously, to interpret the data present within the visual data. In the system, the screenshare alternative system may generate text, based upon the visual data and by use of machine-learning model utilizing an NLP technique. After generating the text, the screenshare system may provide this interpreted visual data in a text-form via a communication method (e.g., text message, email, SLACK, etc.) to the participant. Additionally, or alternatively, similarly to the user of the machine-learning model generating text from the visual data, the screenshare alternative method may utilize a screen grabbing technique (e.g., screenshots, etc.) to capture visual data, and thereafter to supply the screen grabbed data to the participant via a communication method (e.g., text message, email SLACK, etc.) to the participant. In the system, the screenshare alternative system may portion the visual data into visual aspects, and upon detection of a trigger, as mentioned previously, the screenshare alternative method may provide a visual aspect accordingly.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, during a meeting comprising at least one participant remote to a user identified as a presenter and utilizing a screenshare alternative system, visual data shared from an information handling device of the presenter to an information handling device of the at least one participant;
   identifying, utilizing the screenshare alternative system, an issue displaying the visual data on the information handling device of the at least one participant, wherein the identifying comprises determining a quality level of viewing the visual data is below a predetermined threshold and being caused by a network connection characteristic; and
   providing, utilizing the screenshare alternative system, an alternative provision of the visual data to the at least one participant, wherein the providing comprises providing portions of the visual data at intervals, wherein the alternative provision of the visual data is selected to overcome the issue with displaying the visual data and wherein different issues with displaying the visual data have different alternative provisions.

2. The method of claim 1, wherein the identifying comprises determining the information handling device of the at least one participant does not contain a display.

3. The method of claim 1, wherein the identifying comprises determining the information handling device of the at least one participant has a network connection having a quality less than a predetermined threshold.

4. The method of claim 1, wherein the identifying comprises identifying a state of the at least one participant while attending the virtual meeting; and
   wherein the state reduces an ability of the at least one participant to view the visual data.

5. The method of claim 1, wherein the intervals are based upon a trigger, wherein the trigger is identified utilizing a machine-learning model that identifies topics within the meeting and wherein the trigger comprises a change in topic.

6. The method of claim 1, wherein the providing comprises providing the screenshare data to a device of the at least one participant other than the information handling device.

7. The method of claim 1, wherein the providing comprises generating text based upon the visual data and providing the text to the at least one participant.

8. The method of claim 1, wherein the providing comprises capturing, utilizing a screen capturing technique, visual aspects of the visual data and sending the visual aspects to the at least one participant.

9. An information handling device, the information handling device comprising:
   a processor;
   a memory device that stores instructions that when executed by the processor, causes the information handling device to:
      detect, during a meeting comprising at least one participant remote to a user identified as a presenter and utilizing a screenshare alternative system, visual data shared from an information handling device of the presenter to an information handling device of the at least one participant;
      identify, utilizing the screenshare alternative system, an issue displaying the visual data on the information handling device of the at least one participant, wherein the identifying comprises determining a quality level of viewing the visual data is below a predetermined threshold and being caused by a network connection characteristic; and
      provide, utilizing the screenshare alternative system, an alternative provision of the visual data to the at least one participant, wherein the providing comprises providing portions of the visual data at intervals, wherein the alternative provision of the visual data is selected to overcome the issue with displaying the visual data and wherein different issues with displaying the visual data have different alternative provisions.

10. The information handling device of claim 9, wherein the identifying comprises determining the information handling device of the at least one participant does not contain a display.

11. The information handling device of claim 9, wherein the identifying comprises determining the information handling device of the at least one participant has a network connection having a quality less than a predetermined threshold.

12. The information handling device of claim 9, wherein the identifying comprises identifying a state of the at least one participant while attending the virtual meeting; and
    wherein the state reduces an ability of the at least one participant to view the visual data.

13. The information handling device of claim 9, wherein the intervals are based upon a trigger, wherein the trigger is identified utilizing a machine-learning model that identifies topics within the meeting and wherein the trigger comprises a change in topic.

14. The information handling device of claim 9, wherein the providing comprises providing the screenshare data to a device of the at least one participant other than the information handling device.

15. The information handling device of claim 9, wherein the providing comprises generating text based upon the visual data and providing the text to the at least one participant.

16. A product, the product comprising:
    a non-transitory computer-readable storage device that stores executable code that, when executed by a processor, causes the product to:
    detect, during a meeting comprising at least one participant remote to a user identified as a presenter and utilizing a screenshare alternative system, visual data shared from an information handling device of the presenter to an information handling device of the at least one participant;
    identify, utilizing the screenshare alternative system, an issue displaying the visual data on the information handling device of the at least one participant, wherein the identifying comprises determining a quality level of viewing the visual data is below a predetermined threshold and being caused by a network connection characteristic; and
    provide, utilizing the screenshare alternative system, an alternative provision of the visual data to the at least one participant, wherein the providing comprises providing portions of the visual data at intervals, wherein the alternative provision of the visual data is selected to overcome the issue with displaying the visual data and wherein different issues with displaying the visual data have different alternative provisions.

\* \* \* \* \*